Sept. 21, 1965   W. A. RUMBAUGH   3,206,893
GEAR HONING TOOL
Filed April 9, 1963
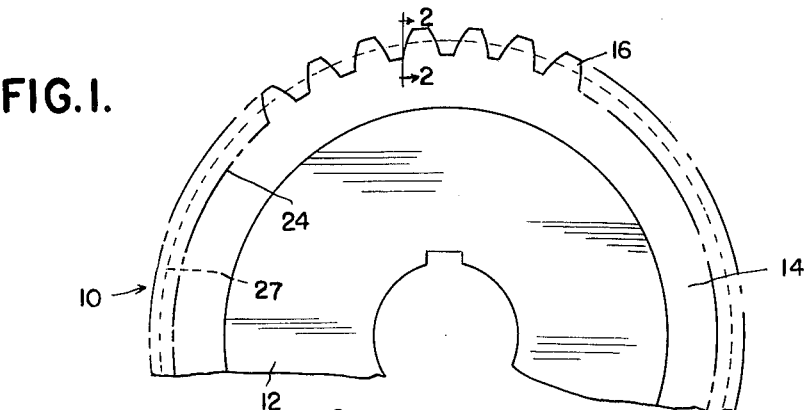
FIG.1.
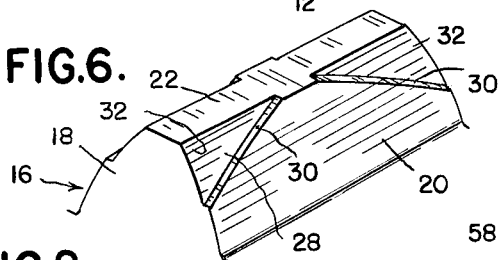
FIG.6.   FIG.11.
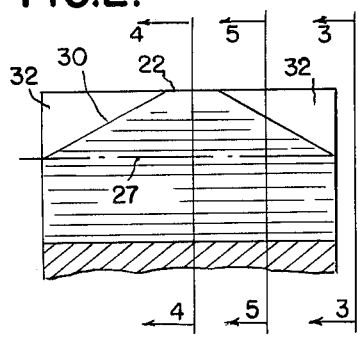
FIG.2.
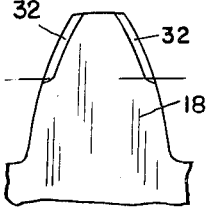
FIG.3.
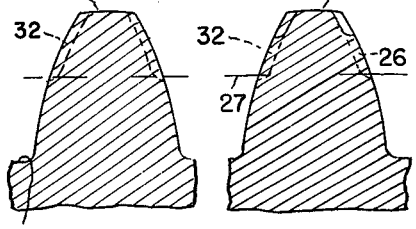
FIG.4.   FIG.5.
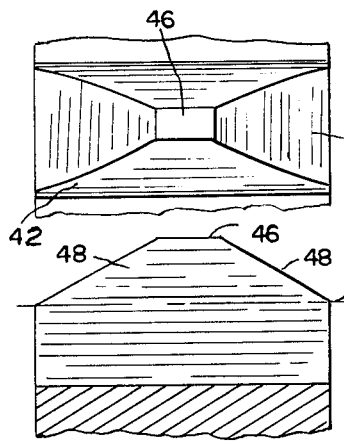
FIG.8.
FIG.9.
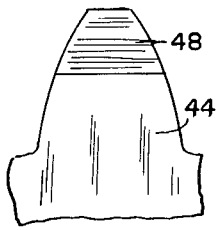
FIG.10.
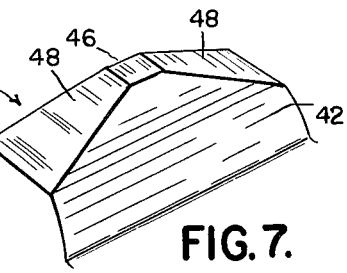
FIG.7.
INVENTOR.
WILLIAM A. RUMBAUGH
BY Whittemore, Hulbert
& Belknap
ATTORNEYS United States Patent Office 3,206,893
Patented Sept. 21, 1965

3,206,893
GEAR HONING TOOL
William A. Rumbaugh, Indianapolis, Ind., assignor to National Broach & Machine Company, Detroit, Mich., a corporation of Michigan
Filed Apr. 9, 1963, Ser. No. 271,638
3 Claims. (Cl. 51—206)

This invention relates to a gear honing tool which is particularly adaptable for honing gears on which it is desirable to produce a hollow involute. Conventional hones or honing tools have shown a tendency to undercut the involute on the gears. The honing tool of the present invention has a series of modified involute teeth and is designed to produce substantially the desired hollow involute on the gear to be finished without any undercutting whatsoever.

An object of the present invention is to provide a honing tool wherein the tops of the teeth are relieved.

It is an object of the present invention to provide a honing tool having a series of teeth of modified involute configuration, the surface portions of which are of a relatively hard but slightly yieldable, highly resilient plastic material having abrasive particles embedded therein, each tooth having top corner portions of the surfaces at opposite sides thereof relieved.

It is another object of the present invention to provide a honing tool of the type described in the preceding paragraph wherein the relieved portions are bounded by lines extending from adjacent the midpoint of the teeth at the crests thereof to the ends thereof adjacent the pitch line.

Still another object of the present invention is to provide a honing tool of the aforementioned type wherein the aforesaid boundary lines are in the form of abrupt shoulders.

It is thus another object of this invention to provide a simplified low-cost structure of the aforementioned type having certain advantages contributing to efficiency, reliability and long life as well as ease of maintenance.

Further objects and advantages of the present invention will be apparent from the following description, reference being had to the accompanying drawing wherein a preferred form of the present invention is clearly shown.

FIGURE 1 is a fragmentary elevational view of a honing tool constructed in accordance with the present invention.

FIGURE 2 is a side elevation of a modified tooth of the honing tool taken on line 2—2 of FIGURE 1.

FIGURE 3 is an end view of the modified involute tooth taken on line 3—3 of FIGURE 2.

FIGURE 4 is a sectional view of the modified involute tooth taken on line 4—4 of FIGURE 2.

FIGURE 5 is another sectional view of the modified involute tooth taken on line 5—5 of FIGURE 2.

FIGURE 6 is a perspective view of the modified involute tooth illustrated in FIGURES 2–5.

FIGURE 7 is a perspective view of still another embodiment of the present invention.

FIGURE 8 is a plan view of the modified involute tooth illustrated in FIGURE 7.

FIGURE 9 is a side elevation of the modified involute tooth illustrated in FIGURE 7.

FIGURE 10 is an end elevation of the modified involute tooth illustrated in FIGURE 7.

FIGURE 11 is a perspective view of another embodiment of a modified involute tooth.

The present invention relates to the development known as gear honing in which a gear-like tool, preferably after heat treatment or other hardening operation, is run in mesh with a gear-like hone. A hone is a tool in the form of a gear having at least its toothed positions formed of a relatively hard but slightly yieldable and highly resilient resin having abrasive particles separately embedded therein.

The operation is carried out by driving either the gear or the hone in rotation, thereby driving the other of the members which is mounted for susbtantially free rotation. During meshed rotation between the gear and hone, a relative traverse is carried out in a plane parallel to the axes of both spindles or supports to insure distribution of the finishing action of the hone from end to end of the gear teeth. This relative traverse is normally in a direction parallel to the axis of the gear.

Referring now to the drawing, there is illustrated a portion of a gear honing tool indicated generally at 10. The inner annular portion or core 12 may be formed of any suitable material such as metal, but for convenience and economy, it is preferred to use a resin compound which may be similar to the resin employed in the toothed portion of the hone, except that it does not contain abrasive grains or particles. The outer toothed portion indicated at 14, is formed of the resin compound and has its teeth 16 accurately shaped to be conjugate to the desired final form of the work gear to be finished. The outer tooth portion 14 of the hone 10 contains a multiplicity of abrasive particles.

A material which has proven exceptionally efficient in producing gear hones is a resin compound formed of equal parts by weight of epoxy resin and a relatively fine abrasive material such, for example, as powdered silicon carbide. The epoxy resin is the result of a reaction between epichlorohydrin and Bisphenol-A carried out in the presence of a water solution of sodium hydroxide at a temperature of approximately 100 degrees Fahrenheit. The reaction is continued to produce an epoxy resin having an approximate molecular weight of 400. The epoxy resin is liquid. The epoxy value, equiv./100 gm. is 0.50. The hydroxyl groups per molecule are 0.14–0.28.

This resin compound, in order to produce the gear honing tools having the toothed peripheral portion shown, is mixed with abrasive material and hardener in approximately the following proportions by weight:

Resin compound _____ 100
Abrasive grains (46–280 grit) _____ 100–150
Hardener (aliphatic or polyamine such as metaphenylene diamine) _____ 15–20

This material may be readily cast to the solid form and is characterized in part by its dimensional stability which permits casting to the final required dimensions. A further discussion of the material utilized in making the honing tool is contained in the Praeg et al. Patent Number 2,913,858 issued November 24, 1959, and assigned to the same assignee as the present invention.

FIGURES 2–6 illustrate the preferred modified form of the tooth 16. The tooth 16 includes ends 18 and sides 20. The length of the tooth 16 is measured between the front end 18 and the rear end 18. The depth of the tooth 16 is measured from the crest 22 to the root or dedendum circle 24. The addendum is measured from the top or crest 22 to the pitch circle 27.

Each side 20 of the tooth 16 is provided with a pair of relieved zones 28 in each side thereof. Each zone 28 extends from a point on the crest 22 downwardly and outwardly to the end 18 of the tooth 16 adjacent the pitch circle. Each of the zones 28 is triangularly shaped and of substantially uniform depth. Zone 28 is defined by a downwardly and outwardly sloping surface 30 starting at the crest 22 and terminating at the end 18 adjacent the pitch circle 27 and a surface 32 offset inwardly towards the longitudinal centerline of the tooth and substantially parallel to the curved side 20.

FIGURES 7–10 illustrate another embodiment wherein the majority of the top of each tooth 40 is cut away or relieved. The tooth 40 includes sides 42, ends 44, and the crest 46. Each tooth is modified so as to provide a pair of sloping surfaces 48. Each surface 48 extends from the crest 46 to the end 44 adjacent the pitch circle 50. The longitudinal edges of surface 48 intersect the sides 42. It should be noted that each surface 48 has a length greater than the length of crest 46.

FIGURE 11 illustrates a tooth 54 having sides 56, ends 58, and a crest 60. A pair of relieved sloping surfaces 62 are provided on each side 56. Each surface 62 has a boundary line 64 starting at a point on the crest 60 adjacent the midpoint of the tooth and sloping along the side 56 to the end 58 adjacent the pitch circle. The surface 62 is inclined from the edge 64 inwardly at the unmodified involute surface 56 to provide relief.

In all three embodiments the portions of the sides of the teeth that are not relieved constitute the effective working area of the teeth which is brought into engagement with the gears to be finished.

The drawing and the foregoing specification constitute a description of the improved gear honing tool in such full, clear, concise, and exact terms as to enable any person skilled in the art to practice the invention, the scope of which is indicated by the appended claims.

What I claim as my invention is:

1. A gear hone adapted for rotation at crossed axes and in tight mesh with an external gear comprising an external gear-like body having an annular toothed portion provided with a series of teeth of generally involute configuration conjugate to the required tooth form of the gear to be finished, the side surface portions of the teeth of said hone being of a relatively hard but slightly yieldable highly resilient plastic material having abrasive particles embedded therein, the side surfaces of each tooth having two inwardly relieved generally triangular zones at the top corner portions at each side thereof, said zones being bounded by lines which extend from points at the crest of said teeth adjacent to but spaced slightly from the mid-points thereof to the adjacent end surfaces thereof and intersecting said end surfaces closely adjacent to the pitch circle of the teeth.

2. A hone as defined in claim 1 in which the relieved zone at each corner portion is of uniform depth and the boundary lines between the relieved zones and the remaining side surfaces of the teeth are abrupt shoulders.

3. A hone as defined in claim 1 in which the relieved zone at each corner portion is of gradually increasing depth from the said boundary lines to the adjacent top corner of the tooth.

References Cited by the Examiner

UNITED STATES PATENTS

| | | | |
|---|---|---|---|
| 1,698,215 | 1/29 | Copland et al. | 51—287 |
| 1,813,875 | 7/31 | Fehr. | |
| 2,913,858 | 11/59 | Praeg et al. | 51—206 |

LESTER M. SWINGLE, *Primary Examiner.*